US010520598B2

(12) United States Patent
Calvarese et al.

(10) Patent No.: US 10,520,598 B2
(45) Date of Patent: Dec. 31, 2019

(54) FRAME AWARE AUTOMATIC GAIN CONTROL

(71) Applicant: SYMBOL TECHNOLOGIES, LLC, Lincolnshire, IL (US)

(72) Inventors: Russell Calvarese, Stony Brook, NY (US); Menuka Gayan Senevirathna, Matara (LK); Richard J. Lavery, Huntington, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 316 days.

(21) Appl. No.: 15/702,965

(22) Filed: Sep. 13, 2017

(65) Prior Publication Data

US 2019/0079184 A1    Mar. 14, 2019

(51) Int. Cl.
*G01S 15/10* (2006.01)
*G01S 7/52* (2006.01)

(52) U.S. Cl.
CPC .......... *G01S 15/10* (2013.01); *G01S 7/52028* (2013.01)

(58) Field of Classification Search
CPC ......... G01S 15/10; G01S 7/52028; G01S 5/30
See application file for complete search history.

(56) References Cited

U.S. PATENT DOCUMENTS

| 10,341,815 | B1* | 7/2019 | Calvarese | ............... H02J 50/90 |
| 2019/0079184 | A1* | 3/2019 | Calvarese | ........... G01S 7/52028 |
| 2019/0200163 | A1* | 6/2019 | Calvarese | ............... H02J 50/90 |
| 2019/0268719 | A1* | 8/2019 | Calvarese | ............. H04W 4/023 |

* cited by examiner

*Primary Examiner* — Daniel Pihulic
(74) *Attorney, Agent, or Firm* — Yuri Astvatsaturov

(57) ABSTRACT

A method and apparatus for automatic gain control in a frame-aware pulsed ranging system is disclosed. A frame covers a period of time, and locationing pulses are emitted once per frame. The pulses are detected by a mobile unit with a microphone, which is able to trilaterate its physical position. To counteract false positives from reverberations of pulses emitted in prior frames, a noise threshold function declines over the course of the frame. As such, small amplitude locationing pulses received late in a frame are still detected because the small amplitude pulse exceeds the decayed noise threshold function. In this way, the noise threshold function is a filter that may detect high amplitude pulses early in a frame as well as small amplitude pulses late in a frame without detecting reverberation pulses early in a frame as false positives.

20 Claims, 5 Drawing Sheets

FRAME AWARE AUTOMATIC GAIN CONTROL

BACKGROUND OF THE INVENTION

Pulses in ultrasonic locationing systems often cause reverberation effects within an operational area. Detectors in the area listening for pulses associated with certain time frames may set an automatic gain control threshold to distinguish the ultrasonic pulses from background noise. Setting an automatic gain control in this manner may filter out small amplitude pulses that occur late in the timeframe of the ultrasonic pulse.

Accordingly, there is a need for a frame aware automatic gain control for use in ultrasonic systems such as ultrasonic locationing systems that may include reverberation effects and small amplitude pulses late in a frame.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
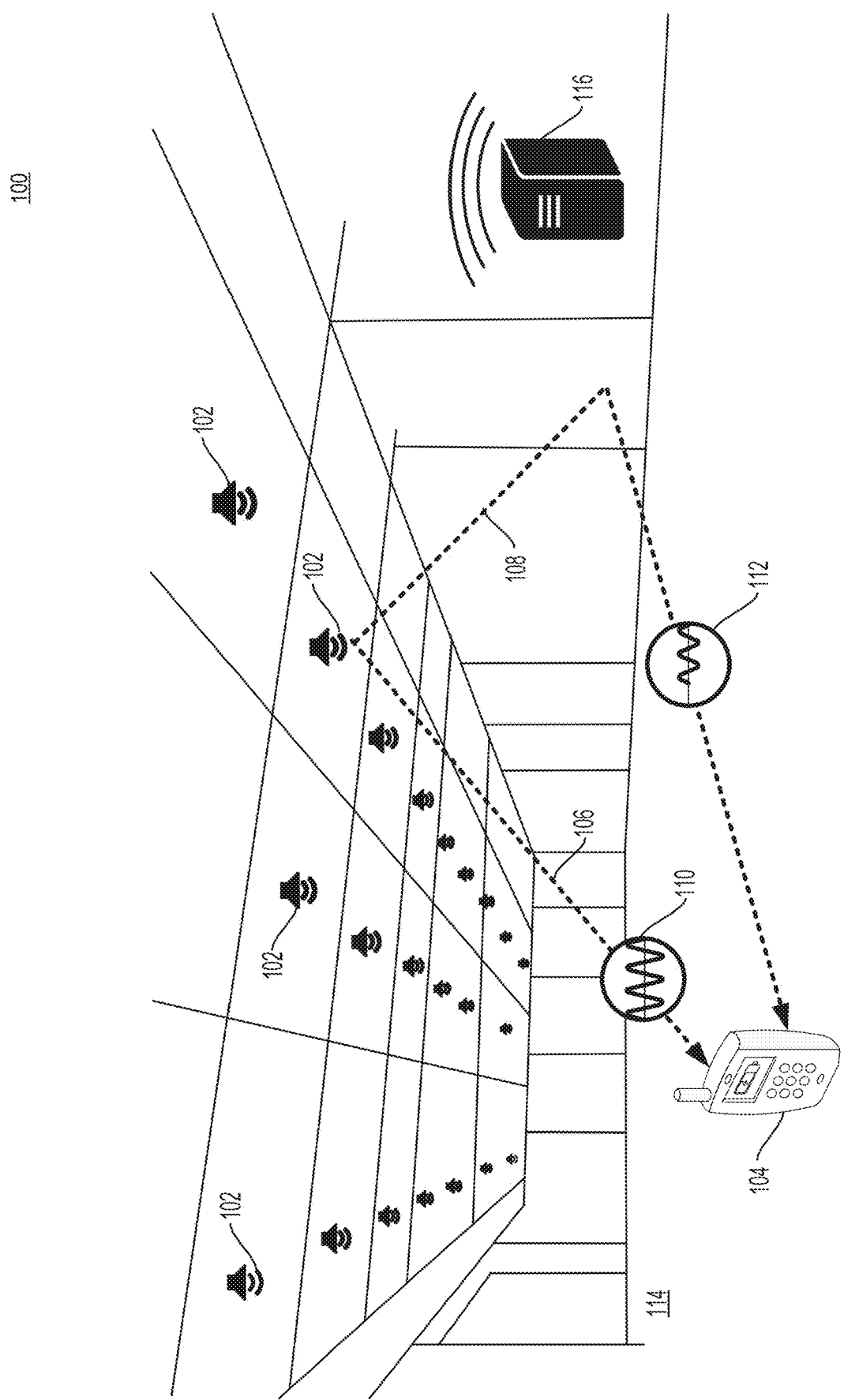
FIG. 1 is a diagram of frame aware automatic gain control in an ultrasonic locationing system including an array of transmitters and a detector in an area in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In some embodiments, the present disclosure discloses a method of locationing. The exemplary method includes: emitting, in a first frame period, a locationing pulse from a transmitter, the locationing pulse having a frequency; receiving, at a detector, signals in a frequency band, the frequency band including the frequency of the locationing pulse; determining a noise threshold function for the first frame period, the noise threshold function being a function of time during the first frame period and being based at least in part on a signal in the frequency band detected by the detector in a prior frame period, the prior frame period occurring before the first frame period; and detecting, in the first frame period, the locationing pulse at the detector if the locationing pulse satisfies a noise threshold condition, the noise threshold condition being based on the noise threshold function.

In some embodiments, the present disclosure discloses a locationing system which includes: a plurality of transmitters positioned in an area, at least one of the plurality of transmitters configured to emit an ultrasonic pulse in a frequency band during a first frame period; a detector configured to detect signals in the frequency band, the detector being moveable in the area; a frame aware automatic gain controller configured to determine a noise threshold function, the noise threshold function being a function of time during the first frame period; and a controller circuit configured to recognize the ultrasonic pulse if a power of the signals detected in the frequency band during the frame period exceeds the noise threshold function.

Referring now to the drawings, FIG. 1 is a diagram of frame aware automatic gain control in an ultrasonic locationing system 100 including an array of ultrasonic transmitters 102 and a detector device 104 in an area 114 in accordance with some embodiments. A set of transmitters 102 are arranged with respect to the area 114. In one implementation, the array of transmitters is arranged in a grid pattern in a ceiling disposed above a floor area 114. The transmitters 102 emit ultrasonic pulses that can be used to determine a location of the electronic device 104 by, for example, trilateration. In one implementation, the transmitters 102 are audio speakers emitting locationing pulses in the 20 KHz frequency band.

The device 102 may be a handheld electronic device (e.g., smartphone, tablet, etc.) equipped with a microphone capable of receiving ultrasonic pulses in the frequency band used by the transmitters 102. The electronic device may be equipped with a microphone to sense ultrasonic pulses. The electronic device may sample signals detected by the microphone by sampling the microphone output or reading microphone output at intervals from a buffer.

The transmitters 102 may emit pulses according to frame periods wherein each frame period is a period of time during which a pulse is emitted. In some implementations, a single pulse is emitted by one of the transmitters 102 per frame period. In other implementations, multiple locationing pulses could be emitted by one or multiple transmitters during a frame period. Based on an amount of time between the emission of a locationing pulse and detection of the locationing pulse by the electronic device 104, a distance may be calculated between the transmitter 102 that emitted the locationing pulse and the electronic device 104. If the electronic device 104 is aware of the frame period and which of the plurality of transmitters 102 is emitting a locationing pulse in a given frame, then the electronic device 104 may determine the distance between the electronic device 104 and the transmitter that emitted the locationing pulse during the frame period. In one implementation, locationing pulses are emitted by a transmitter in the plurality of transmitters 102 at the beginning of a frame or at the beginning of each frame in a series of frames spanning a time period during which the system 100 is in operation.

In one implementation, the controller 116 trilaterates a physical position of the electronic device 104 based on a received communication from the electronic device 104 including information on when the electronic device 104 detected locationing pulses in the various frames. In another implementation, the electronic device 104 may trilaterate its own position based on multiple locationing pulses in multiple frame periods, each locationing pulse emanating from one or more different transmitters in the plurality of transmitters 102. In this sense, the electronic device can be "frame aware" since information linking frame periods to individual transmitter pulses is available to the electronic device 104.

A location of the electronic device 104 is determined more accurately as the electronic device 104 detects more locationing pulses across multiple frames. In other words, accuracy suffers if the electronic device 104 does not detect a locationing pulse during a frame (e.g., a missed frame). On the other hand, a false positive detection of a locationing pulse (e.g., a signal that was part of background noise or other noise and not a real locationing pulse) also harms accuracy because the false positive causes an incorrect distance determination by the electronic device 104. Accuracy is therefore improved if a locationing pulse is detected during each frame in which they were emitted and false positive locationing pulses are avoided.

Characteristics of signals detected by the electronic device 104 will vary depending on the distance between the electronic device 104 and the transmitter 102 that emitted the locationing pulse, whether the signal was received directly from a transmitter 102 or whether the signal reverberated off of elements of the environment of the area 114 before reaching the electronic device 104. If the electronic device 104 is near to the transmitter 102 that emits a locationing pulse in a first frame (e.g., the electronic device 104 is disposed directly under a transmitter 102 in a ceiling over an area 114 emitting a locationing pulse), then the electronic device 104 will detect a strong signal early in the frame because the amplitude of the locationing pulse will decrease as its path distance increases. In comparison, the transmitter 102 that emits a locationing pulse in a first frame is located far away from the electronic device 104 in the area 114 (e.g., the transmitter is in a far corner of the area 114 compared to the electronic device 104), then the signal strength of the signal received by the electronic device 104 will be lower (e.g., a low amplitude pulse detection) and will arrive relatively later in the frame compared to a locationing pulse sent by a closer transmitter.

The electronic device may continue to detect signals from a locationing pulse in frames after the frame in which the locationing pulse was emitted. In the example illustrated in FIG. 1, a locationing pulse 106 is emitted with an amplitude 110 in a first frame period. The locationing pulse includes a reverberation component 108 that reverberates off of elements in the environment of area 114 and reaches the electronic device later than the locationing pulse 106 (e.g., in a later frame than the frame in which the locationing pulse was emitted).

One way to detect true locationing pulses in more frames is to set a noise threshold such that only signals received that exceed the noise threshold in the frequency band of the locationing pulses is detected as a locationing pulse 106 by the electronic device 104. In one implementation, the noise threshold is defined by a decaying function due to the nature of locationing pulse intensity based on distance between the electronic device 104 and the transmitter 102 that emitted the locationing pulse. If the noise threshold function is relatively higher at the beginning of a frame, locationing pulses received from a nearby transmitter will still likely exceed the noise threshold function and be recorded as a detection of a locationing pulse for the relevant frame. If reverberations of locationing pulses emitted in earlier frames arrive at the electronic device 104 near the beginning of a frame, the reverberation signals are less likely to be falsely recorded as a detection of a locationing pulse emitted during the frame period because reverberation signals are more likely to have lower amplitude than signals that are received directly from a transmitter 102 by the electronic device 104. Reverberation signals are therefore less likely to exceed the noise threshold and trigger a false positive locationing pulse detection due to their lower amplitudes.

As a frame progresses, the noise threshold function declines (e.g., in a decaying manner), such that small amplitude locationing pulses received late in a frame are still detected because the small amplitude pulse may exceed the decayed noise threshold function. In this way, the noise threshold function (also referred to herein as frame aware automatic gain control) is a filter that may detect high amplitude pulses early in a frame as well as small amplitude pulses late in a frame without detecting reverberation pulses early in a frame as false positives.

In at least one implementation, the system 100 includes a controller 116 communicatively coupled to other components in the system, for example without limitation, each of the transmitters 102 and/or the electronic device 104. The controller 116 may select individual transmitters from the plurality of transmitters 102 to emit a locationing pulse in a given frame. The controller 116 may determine the length of a frame period and determine other parameters relating to the system 100 (e.g., in which frequency band the transmitters 102 will emit locationing pulses, how a noise floor should be calculated, parameters of the noise threshold function to employ, etc.). The controller 116 may perform any of the noise threshold determinations disclosed herein instead of performance by the electronic device 104.

The controller 116 may select transmitters 102 to emit locationing pulses based on the detection of prior locationing pulses by the electronic device 104 that were communicated to the controller 116. For example, if the electronic device 104 detects a locationing pulse in a first frame that indicates the electronic device 104 is relatively far away from the transmitter 102 that emitted the pulse, the controller 116 may select a transmitter that is likely to be closer to the electronic device 104 in a second frame. The controller 116 may communicate via a wired or wireless connection with the other components in the system 100 (e.g., wirelessly transmitting instructions to individual transmitters 102 in the plurality of transmitters to emit a locationing pulse, sending/receiving information to/from the electronic device 104 regarding locationing signal detection, performing trilateration determinations, etc.).

Figure 2:
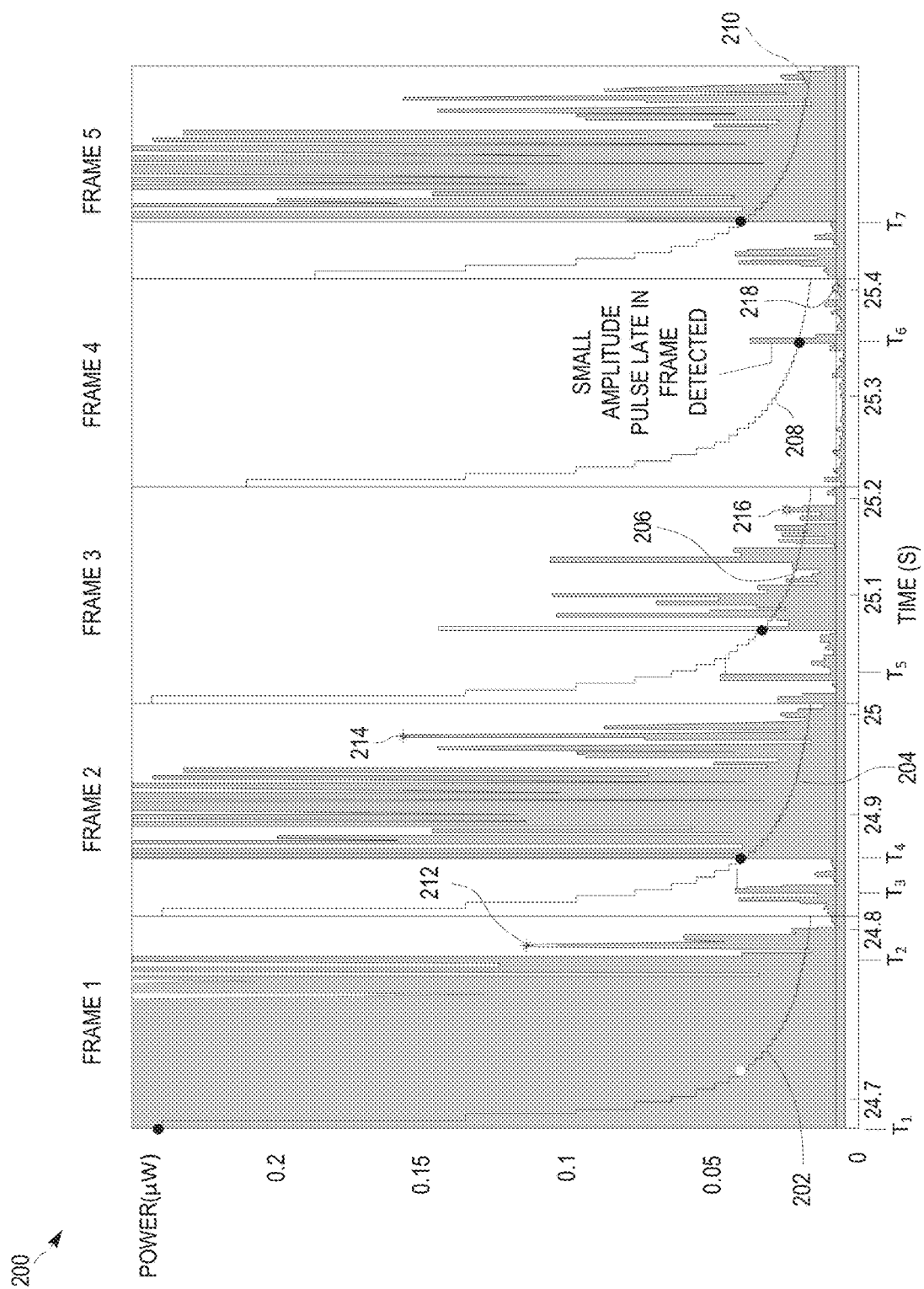
FIG. 2 is a plot of frame aware automatic gain control in multiple frames of an ultrasonic locationing system.

FIG. 2 is a plot 200 of frame aware automatic gain control in multiple frames of an ultrasonic locationing system. The plot 200 shows five frames of the locationing system, labeled Frame 1-Frame 5. The y-axis of plot 200 indicates the amplitude of a locationing pulse received by a mobile detector device as measured in µW. The x-axis of plot 200 indicates the time the mobile detector received the signal shown on the y-axis. In one implementation, each of the frames has an equal duration (e.g., 0.2 seconds). In other implementations, the frames are of variable length.

A detection device may be made "frame aware" via communication with a transmitter controller such that the detection device receives data indicating the start and stop of the frame because of a synchronization mechanism between the controller and detection device. The detection device is therefore aware of each frame (e.g., start and stop time of the frame) such that the noise threshold detection function can be applied over the course of each frame. The detector device may be synchronized with the transmitters according to a communicative coupling between the transmitters, a server, and/or the detection device.

The controller can determine the device position of the device itself can if it includes a model of the space in which the components are located (e.g., physical dimensions, expected reverberation levels based on objects in the space, surface materials in the space, etc.) and a model of the transmitters in the space (e.g., location of each transmitter, identifier for each transmitter, transmitter configurations, transmitter broadcasting frequency, transmitter broadcasting power, etc.). The detection device is therefore able to trilaterate a physical location of itself based on data received from the device showing when the detector device detected locationing pulses during the various frames.

In some implementations, the detection device may communicate with the transmitter controller, such as to communicate to the controller that the detection device has successfully detected a locationing pulse in a frame. The transmitter controller may be able to shorten a frame if the detection device has already received a locationing pulse for that frame period, depending on factors such as the background noise level, reverberation level in the space, etc.

The Frames 1-5 in plot 200 each include a noise threshold function 202, 204, 206, 208, 210. In one implementation, the noise threshold function is a function of time and declines over the course of a frame. The noise threshold function defines a minimum signal amplitude that must be received for the detector device to record a successful hit on a locationing signal. Any received signals that are lower than the noise threshold signal are not considered to be successful detections of a locationing pulse.

Characteristics of a received locationing pulse vary according to the distance between the detector device and the transmitter emitting the pulse during the frame in which the pulse is emitted. The actual received strength of locationing pulses varies from a relatively high level (e.g., 90 dB) to a low level (e.g., near the noise floor) depending how far the transmitter is from the detector. The point in time during a frame in which the locationing pulses are received also depends on distance because locationing pulses from close transmitters will arrive relatively earlier in the frame than pulses from distant transmitters that will arrive later in the frame.

The effects of locationing pulses originating at varying distances from the detector device are shown in plot 200. In the time period labeled Frame 1, the detector encounters a locationing pulse in the locationing pulse frequency band early in the frame and at a high amplitude. The detected locationing signal in Frame 1 exceeds the noise threshold function 202 early in the frame at time $T_1$ (shown by the dot at time $T_1$ on the noise threshold function 202). In one implementation, time $T_1$ is the point in time wherein the locationing pulse is consider to have been encountered. The closeness of time $T_1$ to the beginning of Frame 1 suggests that the particular transmitter that emitted the locationing pulse received in Frame 1 is located a short distance from the detector device.

As Frame 1 progresses, the detector continues to receive a signal in the frequency band of the locationing pulse due to reverberations in the physical space containing the transmitters and detector and potentially other objects (e.g., factory floor, retail space, public space, warehouse space, etc.). Reverberations from the locationing pulse emitted in Frame 1, as measured at the detector, diminish throughout the remainder of Frame 1 and continue into the beginning of Frame 2, shown at time $T_3$.

At the beginning of Frame 2 (e.g., in the area of time $T_3$) there is no detection of a locationing signal even though a locationing signal was emitted at the start of the frame. This indicates that the transmitter that emitted the locationing pulse in Frame 2 is located relatively farther away from the detector device than the transmitter that emitted the locationing signal in Frame 1. At a point $T_4$, the locationing signal encountered by the detector exceeds the value of the noise threshold function and a noise threshold condition is satisfied as indicated by the dot on the noise threshold function 204 at time $T_4$. The locationing pulse emitted in Frame 2 is considered to have been encountered by the detector device at time $T_4$. Due to the shape of the noise threshold function (e.g., decaying), reverberations from the locationing pulse emitted in Frame 1 and encountered by the detector at time $T_3$ in Frame 2 do not satisfy the noise threshold condition because the reverberation signals are lower than the noise threshold function 204 in the area of $T_3$.

The locationing pulse emitted at the beginning of Frame 2 causes the detector to continue encountering reverberations into Frame 3 around time $T_5$. The reverberations around time $T_5$ do not satisfy a noise threshold condition because the reverberation signal is lower than the noise threshold function 206 around time $T_5$. In other words, the shape of the noise threshold function allowed the detector to avoid receiving reverberations early in Frame 3 and falsely identifying the reverberations as the locationing pulse of Frame 3. The locationing pulse of Frame 3 exceeds the noise threshold function at the dot on the curve 206 after time $T_5$.

The locationing pulse emitted in Frame 4 is not detected until late in the frame and at a low amplitude around time $T_6$. The low amplitude and late frame arrival suggest that the transmitter that emitted the locationing pulse in Frame 4 is located far away from the detector device. Due to the shape of the noise threshold function 208 in Frame 4, the locationing pulse exceeds the value of the noise threshold function at time $T_6$ even though the locationing pulse as encountered by the detector device is low-amplitude. Frame 5 is similar to other frames in plot 200 in that a locationing pulse signal is encountered after the beginning of the frame around time $T_7$ and the noise threshold condition is satisfied at time $T_7$ because the locationing pulse signal exceeds the noise threshold function.

A decreasing noise threshold function in the respective frames (e.g., exponentially declining, decaying, etc.) affords several advantages for the system compared to other automatic gain control systems in locationing systems, especially those with locationing pulses having the characteristics described herein. One advantage of a decaying noise threshold function is the ability to detect locationing pulses at both high and low amplitudes without falsely detecting a reverberation in the frequency band as a locationing pulse. Another advantage of a decreasing noise threshold function is the ability to correctly detect small amplitude pulses late in a frame, even small amplitude pulses that are lower in power than reverberations received at other points in the frame including the small amplitude, late-frame pulse or pulses received in other frames.

The noise threshold function may be based parameters that define the plotted shape of the noise threshold function (e.g., linear decay, exponential decay, power function, etc.). The various parameters may be chosen in advance or may vary according to information collected in prior frames. For example, in one implementation, the locationing pulse is detected by a microphone and read by a sampler. The sampler may include a frame buffer into which data may be written and flushed at intervals to the detection device (e.g., a buffer of 5.8 ms of signal data). A noise threshold function parameter may be chosen based on a buffer sample from the sampler in a frame prior to the frame in question. One particular signal buffer may be chosen in a prior frame on which to base a noise threshold function parameter. For example, a fifth-to-the-end signal buffer read before the end of a frame (e.g., sample points 212, 214, 216, 218) may be chosen as the sample buffer. A parameter affecting the shape of the noise threshold function (e.g., starting point at the beginning of the frame, rate of decay, change of rate of decay, etc.) may be based on the value of the chosen sample buffer.

Comparing shapes of the noise threshold functions in Frame 1 and Frame 2 of plot 200, for example, Frame 1 depicts a locationing pulse that was relatively close to the detector, arrived shortly after the beginning of the frame, and caused reverberations into the beginning of Frame 2. Frame 2 depicts a locationing pulse that reached the detector relatively later in the frame than in Frame 1, also with reverberations lasting into the next frame. The buffer sample points 212 and 214 represent, for example, an nth from the end of frame buffer (e.g., fifth from the end) and provide a sampling value onto which to base a starting point of the next noise threshold function. Since the sample point 212 is lower than the sample point 214, the starting parameter is different between noise threshold functions 204 and 206 as indicated by a lower initial value at the beginning of Frames 2 and 3, respectively. The sample buffer could also be used to determine other noise threshold function parameters.

Figure 3:
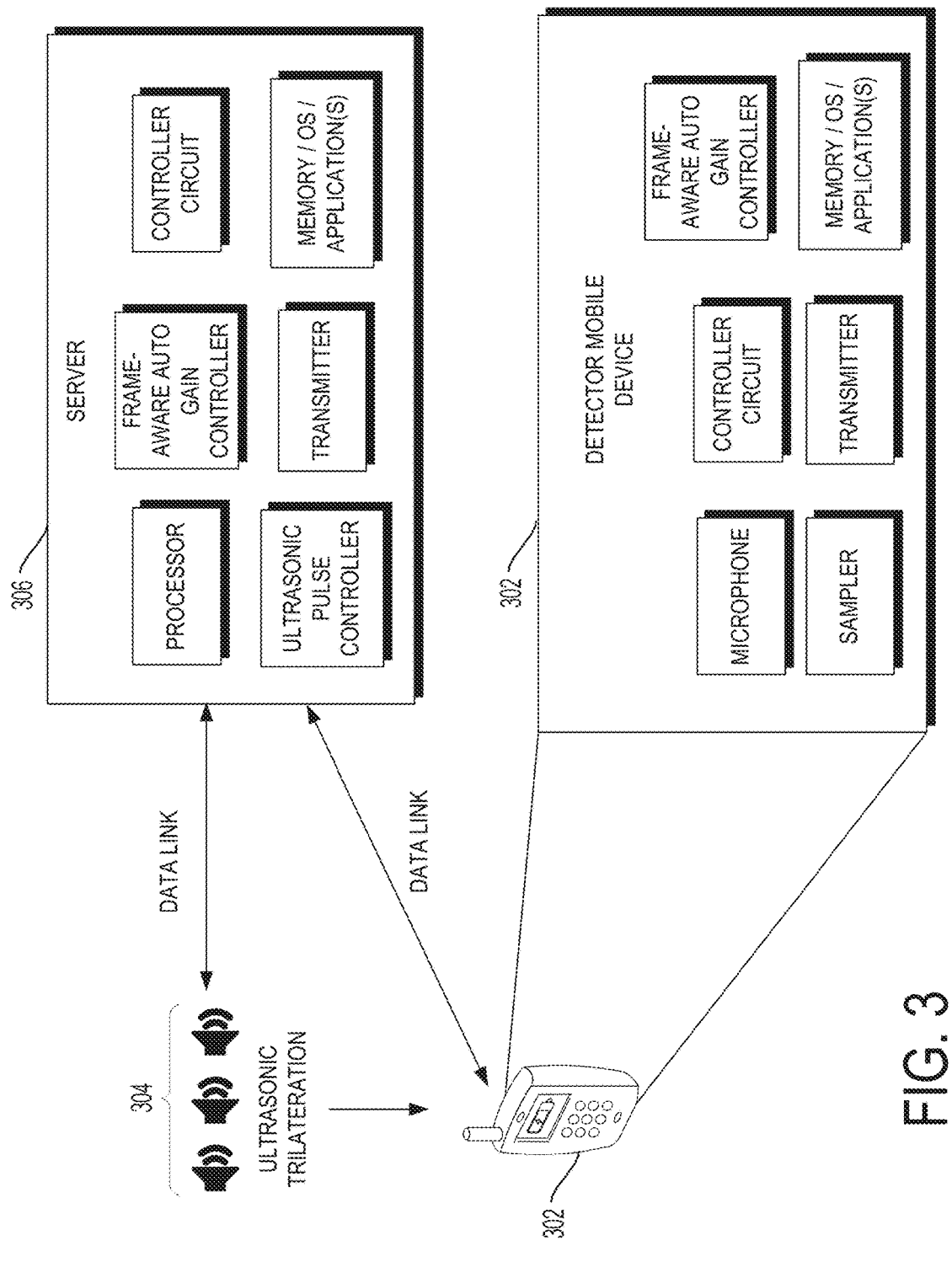
FIG. 3 is a block diagram of an ultrasonic locationing system with frame aware automatic gain control.

FIG. 3 is a block diagram of an ultrasonic locationing system 300 with frame aware automatic gain control. The locationing system 300 includes a locationing pulse detector 302. The locationing pulse detector 302 may be a dedicated piece of hardware or a generally programmable device (e.g., smartphone, tablet, etc.). The locationing pulse detector 302 may be mobile within an area of operation of the locationing system 300 (e.g., factory floor, retail space, public space, warehouse space, hospitality establishment, private space, etc.). For example, the components and functions of the locationing pulse detector 302 may be included in a smart phone held by a person walking within the area of operation of the locationing system 300.

The locationing system 300 includes an array of one or more locationing pulse transmitters 304. The locationing pulse transmitters 304 may be arranged to facilitate trilateration of the detector device 302 within the area of operation of the locationing system 300. In one implementation, the array of locationing pulse transmitters 304 are arranged in a grid formation in the ceiling above the area of operation of the locationing system 300. The array of transmitters 304 may be located in positions other than a ceiling, and may be distributed throughout an enclosed or open space.

Each of the transmitters in the array of transmitters 304 is capable of emitting a locationing pulse. The locationing pulses may be an ultrasonic audio pulses in a frequency band. In at least one implementation, the transmitters in the array of transmitters 304 are audio speakers and the locationing pulses are in the frequency band of 20 KHz (e.g., between 18 kHz and 22 kHz). The transmitters are controlled by other components of the locationing system 300, for example without limitation a server 306, the detection device 302, and/or another controller component. Components controlling the array of transmitters 304 may select an individual transmitter to emit a locationing pulse in a frame period. A location of a transmitter emitting a locationing pulse in a particular frame period may be communicated from the transmitter controller to other components of the system that may use the transmitter location in comparison to a detection time in the frame period by the detector device 302 to determine a location of the detector device 302 within the operation area of the system 300.

The detector device 302 includes components for trilaterating a physical position of the detector device 302 using frame aware gain control. One component of the detector device 302 is a controller circuit. The controller circuit may include a processor and is configured to operate the other components of the detector device 302 including communicating information (e.g., frame and locationing signal data) to other components of the system 300. In another implementation, the ultrasonic range controller of the server 306 is configured to trilaterate a physical position of the detector device 302 using frame aware gain control.

The detector device 302 further may include a microphone and sampler to detect locationing pulses emanating from the array of transmitters 304. The microphone may include capability to detect audio signals in a frequency band in which the transmitters emit locationing pulses (e.g., 20 KHz). A sampler may read audio signals from the microphone into a buffer (e.g., 44.1 KHz sampling) to provision other components of the system (e.g., the memory/OS/applications, controller circuit, frame-aware automatic gain controller, etc.). A frame aware automatic gain controller may determine noise threshold functions to apply to frames as explained in more detail with reference to FIG. 4. Components of the detector device 302 may additionally, or alternatively, be located on a server 306. The server may further include an ultrasonic pulse controller to select individual transmitters in the array of transmitters 304 to emit locationing pules.

Figure 4:
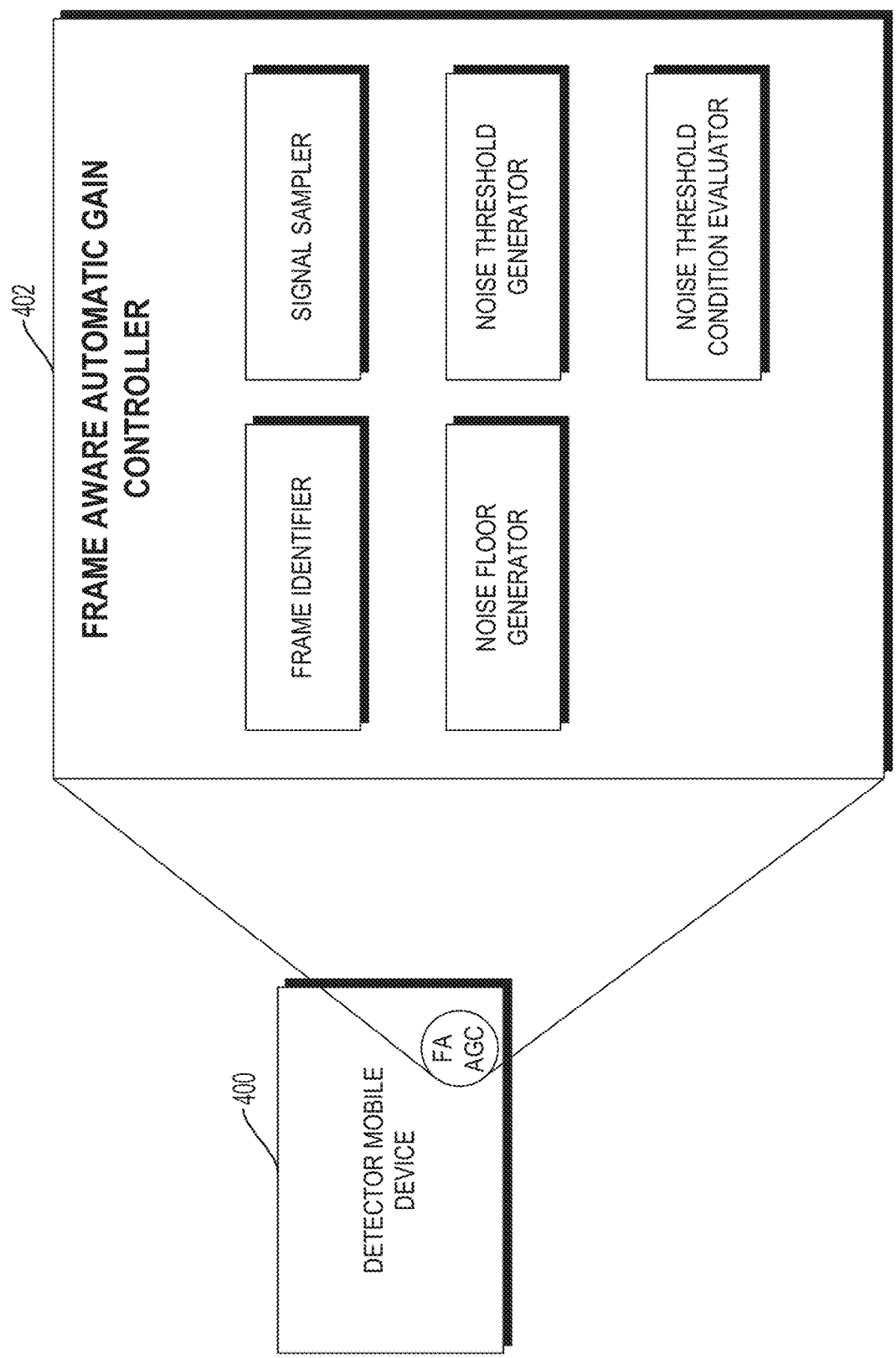
FIG. 4 is a block diagram of a frame aware automatic gain controller in a detector mobile device.

FIG. 4 is a block diagram of a frame aware automatic gain controller 402 in a detector mobile device 400. The frame aware automatic gain controller 402 may include various sub-components useful for determining noise threshold functions and applying noise threshold function to locationing signals. One component of the frame aware automatic gain controller 402 is a frame identifier for synchronizing the detector mobile device 400 with the transmitters emitting locationing signals such that the detector mobile device 400 is aware of the location in an operation area of an emitting transmitter in a particular frame period.

The frame aware automatic gain controller 402 may include a signal sampler to sample locationing pulse signals from a microphone located on the detector mobile device 400. The frame aware automatic gain controller 402 may further include a noise floor detector. The noise floor detector may determine a noise floor below which received signals may be discarded as likely background noise rather than locationing pulses.

The frame aware automatic gain controller 402 further includes a noise threshold generator. The noise threshold generator creates a noise threshold function for any particular frame period. The noise threshold function may be determined at least in part on parameters. The parameters may alter the shape and behavior of the noise threshold function (e.g., shape, steepness, starting point, etc.) and may be sampled from prior frames such as by the signal sampler. In at least one implementation, the signal sampler samples a buffer occurring near the end of each frame period to generate noise threshold function parameters for the next frame.

A noise threshold condition evaluator on the frame aware automatic gain controller 402 may compare signals received by the detector mobile device 400 (e.g., from the signal sampler) to determine whether a received signal exceeds the noise threshold function. If a received signal does exceed the noise threshold function, then the noise threshold condition evaluator may determine that the noise threshold condition has been satisfied.

Figure 5:
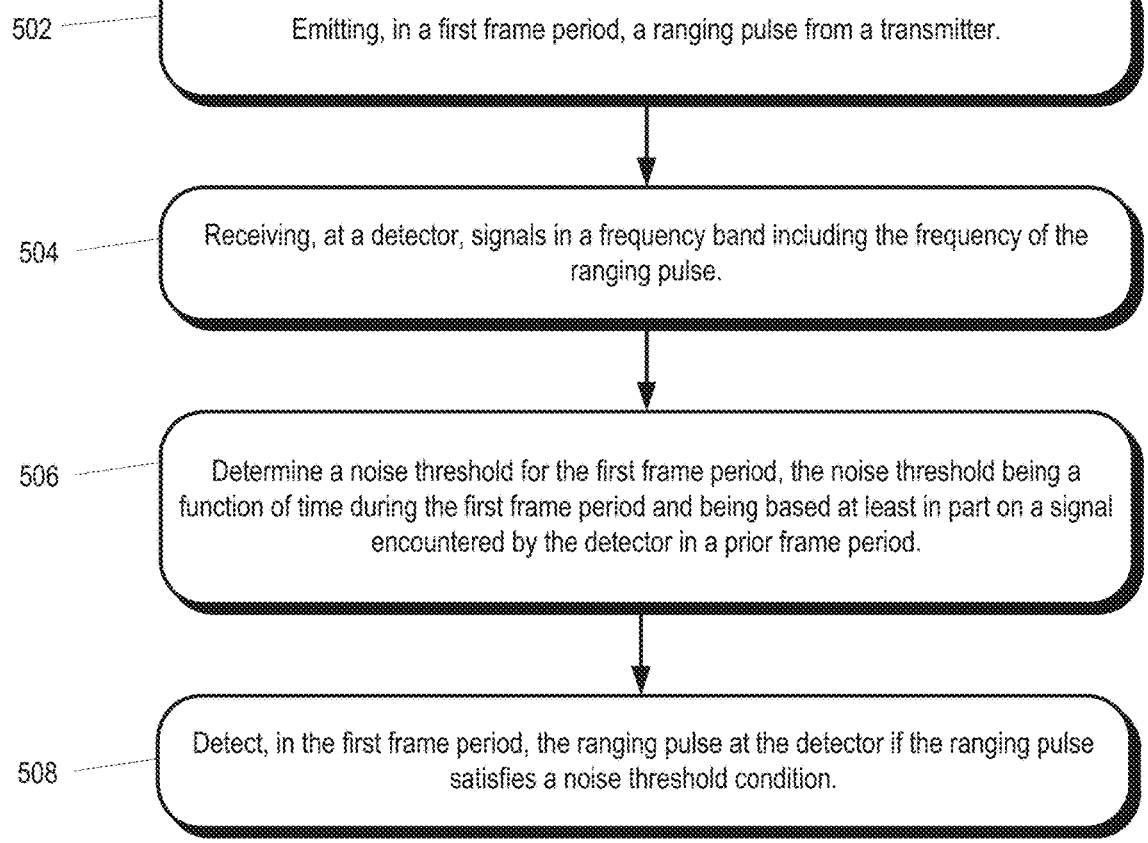
FIG. 5 is a flowchart of a method of locationing with frame aware automatic gain control in accordance with some embodiments.

FIG. 5 is a flowchart of a method 500 of locationing with frame aware automatic gain control in accordance with some embodiments. An emitting operation 502 emits, in a first time period, a locationing pulse from a transmitter. In an implementation, the transmitter emits the locationing pulse in a frequency band. A receiving operation 504 receives, at a detector, signals in the frequency band of the locationing pulse. In an implementation, the receiving operation 504 occurs at a mobile detector device located in an operation area.

A determining operation 506 determines a noise threshold function for the first frame period, the noise threshold function being a function of time during the first frame period and being based at least in part on a signal in the frequency band encountered by the detector in a prior frame period. In one implementation, a signal buffer is sampled near the end of a frame and the signal sample value is used to determine parameters for the noise threshold function. A detecting operation 508 detects, in the first frame period, the locationing pulse at the detector if the locationing pulse satisfies a noise threshold condition. In at least one implementation, a detector device receives a location and frame for each locationing pulse such that the detector device can trilaterate a position within the operating area upon detecting of the locationing pulse.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of locationing, the method comprising:
    emitting, in a first frame period, a locationing pulse from a transmitter, the locationing pulse having a frequency;
    receiving, at a detector, signals in a frequency band, the frequency band including the frequency of the locationing pulse;
    determining a noise threshold function for the first frame period, the noise threshold function being a function of time during the first frame period and being based at least in part on a signal in the frequency band detected by the detector in a prior frame period, the prior frame period occurring before the first frame period; and detecting, in the first frame period, the locationing pulse at the detector if the locationing pulse satisfies a noise threshold condition, the noise threshold condition being based on the noise threshold function.

2. The method of claim 1, wherein the signal in the frequency band detected by the detector in the prior frame period is a sample of signal strength in the frequency band at a sample offset time in the prior frame period.

3. The method of claim 1, wherein the emitting step defines a beginning of the first frame period.

4. The method of claim 1, wherein the noise threshold condition is satisfied if a power of the locationing pulse exceeds a value of the noise function threshold at a time in the first frame period when the locationing pulse is received by the receiver.

5. The method of claim 1, wherein the noise function threshold is a decreasing function of time during the first frame period.

6. The method of claim 5, wherein the decreasing function over time during the first frame period is a decaying function.

7. The method of claim 1, wherein the determining step includes an initial value of the noise threshold function, the initial value of the noise threshold function depending at least in part on an intensity of the signal in the frequency band detected by the detector in the prior frame period.

8. A locationing system, the system comprising:
a plurality of transmitters positioned in an area, at least one of the plurality of transmitters configured to emit an ultrasonic pulse in a frequency band during a first frame period;
a detector configured to detect signals in the frequency band, the detector being moveable in the area;
a frame aware automatic gain controller configured to determine a noise threshold function, the noise threshold function being a function of time during the first frame period; and
a controller circuit configured to recognize the ultrasonic pulse if a power of the signals detected in the frequency band during the frame period exceeds the noise threshold function.

9. The system of claim 8, further comprising:
an ultrasonic pulse controller communicatively coupled to the plurality of transmitters and configured to select the one of the plurality of transmitters to emit the ultrasonic pulse during the first frame period.

10. The system of claim 9, wherein the ultrasonic pulse controller is further configured to receive the recognition of the ultrasonic pulse from the controller circuit.

11. The system of claim 9, wherein the ultrasonic pulse controller is further configured to select others of the plurality of transmitters to emit additional ultrasonic pulses in a second frame period and a third frame period and to trilaterate a position of the detector within the area based on the ultrasonic pulse and the additional ultrasonic pules.

12. The system of claim 8, wherein the noise threshold function is a decaying function.

13. The system of claim 8, wherein the plurality of transmitters are positioned in a grid in a ceiling disposed above the area.

14. The system of claim 8, wherein the noise threshold function is based at least in part on one or more signals sampled in the frequency band in a frame period prior to the first frame period.

15. The system of claim 8, wherein the ultrasonic pulse controller is communicatively coupled to the detector and configured to communicate a location of the transmitter configured to emit an ultrasonic pulse in a frequency band during the first frame period.

16. The system of claim 8, wherein the frame aware automatic gain controller is further configured to determine a second noise threshold function for a second frame period, the second noise threshold function depending at least in part on the noise threshold function.

17. A method of automatic gain control, the method comprising:
detecting signals in a first frame period;
sampling the signals in the first frame period to obtain a noise parameter;
determining a noise threshold function based at least in part on the noise parameter, the noise threshold function being a function of time;
detecting signals in a second frame period; and
filtering the signals in the second frame period according to the noise threshold function.

18. The system of claim 16, wherein the noise threshold function is a decaying function based at least in part on the noise parameter.

19. The system of claim 16, wherein the sampling operation includes sampling multiple signals detected in the first frame period.

20. The system of claim 16, wherein the sampling operation includes sampling the signals in the same bandwidth as the signals detected in the first frame period.

* * * * *